(12) United States Patent
Rajamani et al.

(10) Patent No.: US 9,830,372 B2
(45) Date of Patent: Nov. 28, 2017

(54) SCALABLE COORDINATION AWARE STATIC PARTITIONING FOR DATABASE REPLICATION

(71) Applicant: Oracle International Corporation, Redwood Shores, CA (US)

(72) Inventors: Vasanth Rajamani, San Carlos, CA (US); Lik Wong, Palo Alto, CA (US); Nimar S. Arora, Union City, CA (US); Sean Lehouillier, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 403 days.

(21) Appl. No.: 13/950,207

(22) Filed: Jul. 24, 2013

(65) Prior Publication Data
US 2015/0032694 A1 Jan. 29, 2015

(51) Int. Cl.
*G06F 17/30* (2006.01)

(52) U.S. Cl.
CPC .. *G06F 17/30581* (2013.01); *G06F 17/30368* (2013.01)

(58) Field of Classification Search
CPC ................... G06F 17/30581; G06F 17/30368
See application file for complete search history.

(56) References Cited

U.S. PATENT DOCUMENTS

| | | |
|---|---|---|
| 6,185,699 B1 | 2/2001 | Haderle |
| 6,205,449 B1 | 3/2001 | Rastogi |
| 6,226,650 B1 * | 5/2001 | Mahajan ........... G06F 17/30575 379/93.12 |
| 6,295,610 B1 | 9/2001 | Ganesh |
| 7,305,421 B2 | 12/2007 | Cha |
| 7,822,717 B2 | 10/2010 | Kapoor |
| 8,117,174 B2 | 2/2012 | Shaughnessy |
| 8,364,648 B1 | 1/2013 | Sim-Tang |

(Continued)

OTHER PUBLICATIONS

Oracle Base, Multitenant: Create and Configure a Pluggable Database (PDB) in Oracle Database 12c Release 1 (12.1), dated Jan. 8, 2014, 16 pages.

(Continued)

*Primary Examiner* — Robert Beausoliel, Jr.
*Assistant Examiner* — Susan F Rayyan
(74) *Attorney, Agent, or Firm* — Hickman Palermo Becker Bingham LLP

(57) ABSTRACT

Parallel logical replication involves multiple apply threads running on a destination database server applying, in parallel, changes made by source transactions, where the changes of a single source transaction may be applied in parallel by multiple apply threads. An apply transaction for a source transaction may be committed by an apply thread independently of the commitment of any other apply transaction of the source transaction, that is, without coordinating the committing of another apply transaction executed by another apply thread for the source transaction. A configuration language is used to configure parallel logical replication. The language facilitates the configuration of various aspects of parallel logical replication, including the number of apply threads, partitioning schemes for the apply threads for partitioning change records between the apply threads, and various other aspects of parallel logical replication.

26 Claims, 10 Drawing Sheets

(56) References Cited

U.S. PATENT DOCUMENTS

| | | | | |
|---|---|---|---|---|
| 8,473,953 | B2* | 6/2013 | Bourbonnais | G06F 11/1474 707/703 |
| 8,478,718 | B1* | 7/2013 | Ranade | G06F 11/2094 707/610 |
| 8,930,312 | B1* | 1/2015 | Rath | G06F 17/30575 707/634 |
| 9,026,679 | B1* | 5/2015 | Shmuylovich | G06F 17/30365 707/610 |
| 9,244,996 | B2* | 1/2016 | Bourbonnais | G06F 17/30578 |
| 2002/0112022 | A1 | 8/2002 | Kazar et al. | |
| 2002/0143733 | A1 | 10/2002 | Mukkamalla | |
| 2004/0039962 | A1 | 2/2004 | Ganesh | |
| 2004/0054643 | A1 | 3/2004 | Vemuri | |
| 2004/0054644 | A1 | 3/2004 | Ganesh | |
| 2004/0177099 | A1 | 9/2004 | Ganesh | |
| 2004/0210577 | A1 | 10/2004 | Kundu | |
| 2006/0047713 | A1* | 3/2006 | Gornshtein | G06F 17/30575 |
| 2007/0100912 | A1 | 5/2007 | Pareek | |
| 2007/0244918 | A1 | 10/2007 | Lee | |
| 2008/0005112 | A1* | 1/2008 | Shavit | G06F 9/526 |
| 2011/0060724 | A1 | 3/2011 | Chan | |
| 2011/0087633 | A1 | 4/2011 | Kreuder et al. | |
| 2011/0307450 | A1 | 12/2011 | Hahn | |
| 2012/0278282 | A1* | 11/2012 | Lu | G06F 17/30575 707/634 |
| 2012/0284228 | A1* | 11/2012 | Ghosh | G06F 17/30581 707/615 |
| 2012/0323849 | A1 | 12/2012 | Garin | |
| 2013/0085742 | A1 | 4/2013 | Barker et al. | |
| 2013/0117237 | A1 | 5/2013 | Thomsen et al. | |
| 2013/0198133 | A1* | 8/2013 | Lee | G06F 17/30581 707/611 |
| 2014/0095452 | A1 | 4/2014 | Lee | |
| 2014/0164331 | A1 | 6/2014 | Li | |
| 2015/0120659 | A1 | 4/2015 | Srivastava | |
| 2015/0254240 | A1 | 9/2015 | Li et al. | |
| 2017/0116252 | A1 | 4/2017 | Krishnaswamy | |

OTHER PUBLICATIONS

Garcia-Molina et al., "Database System Implementation", dated Jan. 1, 2000, 84 pages.

Francisco Munoz et al., "Oracle Database 12c Backup and Recovery Survival Guide", dated Sep. 24, 2013, 8 pages.

Das et al., "Albatross: Lightweight Elasticity in Shared Storage Databases for the Cloud Using Live Data Migration", Proceedings of the VLDB Endowment, vol. 4 No. 8 Copyright, dated 2011, 12 pages.

Anonymous: "Oracle-Base—Multitenant: Overview of Container Databases (CDB) and Pluggable Databases (PDB)", dated Mar. 3, 2014, 4 pages.

Anonymous, :An Oracle White Paper Oracle Database Appliance: Migration Strategies, dated Jun. 2012, 14 pages.

Rajeev Kumar et al., ORACLE DBA, A Helping Hand, Container Database and Pluggable Database (CDB & PDB), retrieved from the internet on Dec. 4, 2013, 2 pages.

Preimesberger, Chris, "Oracle Profits Up, but Revenues Slip" Oracle, dated Sep. 20, 2012, 2 pages.

Muhammad Anwar, "How to Install Oracle 12c Multitenant Pluggable Database", Dated Feb. 24, 2012, 27 pages.

Dominic Betts et al., "Developing Multi-Tenant Applications for the Cloud," 3rd Edition, Microsoft, 2012, 246 pages.

U.S. Appl. No. 14/202,091, Filed Mar. 10, 2014, Notice of Allowance, dated Feb. 26, 2016, 25 pages.

* cited by examiner

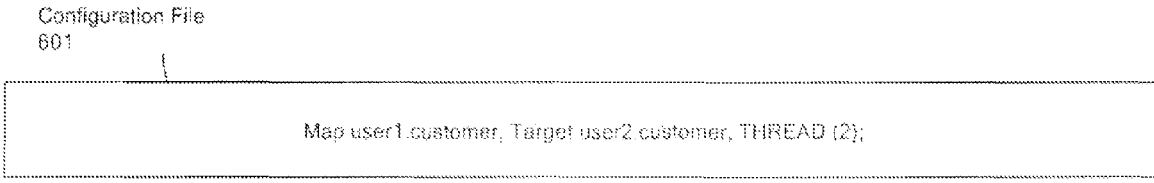

"Assigns to single apply thread #2 change records generated for user1.customer that should be applied to Target user2.customer". Change records will be applied with synchronization event handling."

FIG. 6A

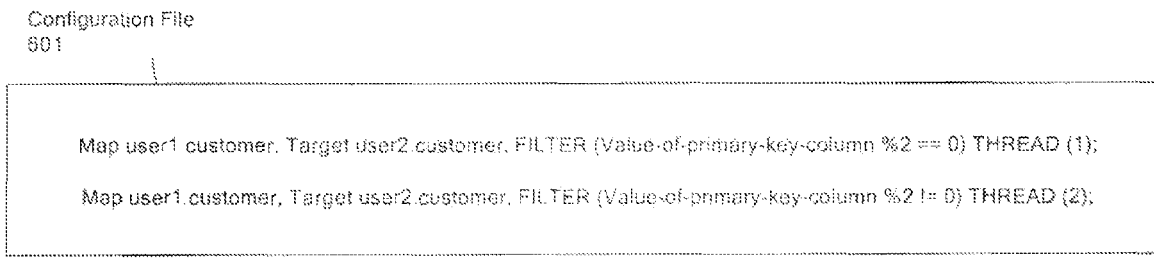

"Assigns change records for rows with even primary key values to apply thread 1 and rows with odd primary key values to apply thread #2."

FIG. 6B

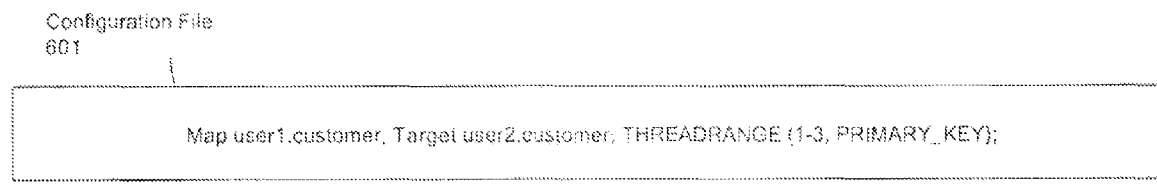

"Split change records between three apply threads #1, #2, #3 based on the primary key of user1.customer."

FIG. 6C

Configuration File
601

```
Map user1.customer, Target user2.customer COORDINATE;
```

"No threads designated, thus apply change records generated for user1.customer that should be applied to Target user2.customer" are applied without synchronization event handling."

FIG. 6D

Configuration File
601

```
TABLE user1.customer EVENTACTION(INSERTS);
```

"Apply synchronization handling for applying inserts for user1.customer"

FIG. 6E

Configuration File
601

```
Map user1.customer*, Target user2.customer* THREAD(2);
```

FIG. 6F

SCALABLE COORDINATION AWARE STATIC PARTITIONING FOR DATABASE REPLICATION

FIELD OF THE INVENTION

The present invention relates to replicating data in database systems.

BACKGROUND

An important feature of database systems is replication. Replication is the process of replicating data from a "source" database server onto another database server, herein referred to as a destination database server. As changes are made to user data on the source database server, the changes are replicated on the destination database server.

Under this approach, the changes made to data blocks on the source database of the source database server are made to replicas of those data blocks on a destination database of a destination database server. Because the source database is replicated at the lowest atomic level of storage space on the destination database, the destination database is a physical replica of the source database.

Another approach to replicating data is the logical replication approach. Under the logical replication approach, transactions that change data on the source database server ("source transaction") are applied as a transaction on the destination database server ("apply transaction"). Because logical replication relies on transaction processing, a description of transaction processing is useful.

Changes to database systems may be made using transaction processing. A transaction is a set of operations that change data. In database systems, the operations are specified by one or more database commands. Committing a transaction refers to making the changes for a transaction permanent.

Under transaction processing, all the changes for a transaction are made atomically. When a transaction is committed, either all changes are committed, or the transaction is rolled back. Because the changes are not permanent until a transaction is committed, the changes for a transaction may not be replicated on a logical standby until the transaction is committed on the primary database. After a transaction is committed on the primary database server, the transactions are re-executed and committed on the source database server.

The term database state, as used herein, refers to values in a database (or any set of data base objects updated through transaction processing) that exist when a particular transaction is committed. As transactions are committed, a database transitions from one database state to another database state.

To replicate data on a logical destination database server more quickly and efficiently, apply transactions may be executed in parallel. Transactions may be executed in parallel by multiple processes, each process executing one of the transactions.

However, there is a need to preserve transaction dependency between certain transactions. Preserving transaction dependency can greatly impede the degree of parallelism that can be achieved and ultimately the scalability of logical replication.

Based on the foregoing, it is clearly desirable to develop an approach that improves the level of parallelism that can be achieved for logical replication.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 6A depicts one or more configuration declarations that may be used to configure parallel replication according to an embodiment of the present invention.

FIG. 6B depicts one or more configuration declarations that may be used to configure parallel replication according to an embodiment of the present invention.

FIG. 6C depicts one or more configuration declarations that may be used to configure parallel replication according to an embodiment of the present invention.

FIG. 6D depicts one or more configuration declarations that may be used to configure parallel replication according to an embodiment of the present invention.

FIG. 6E depicts one or more configuration declarations that may be used to configure parallel replication according to an embodiment of the present invention.

FIG. 6F depicts one or more configuration declarations that may be used to configure parallel replication according to an embodiment of the present invention.

DETAILED DESCRIPTION

Figure 1:
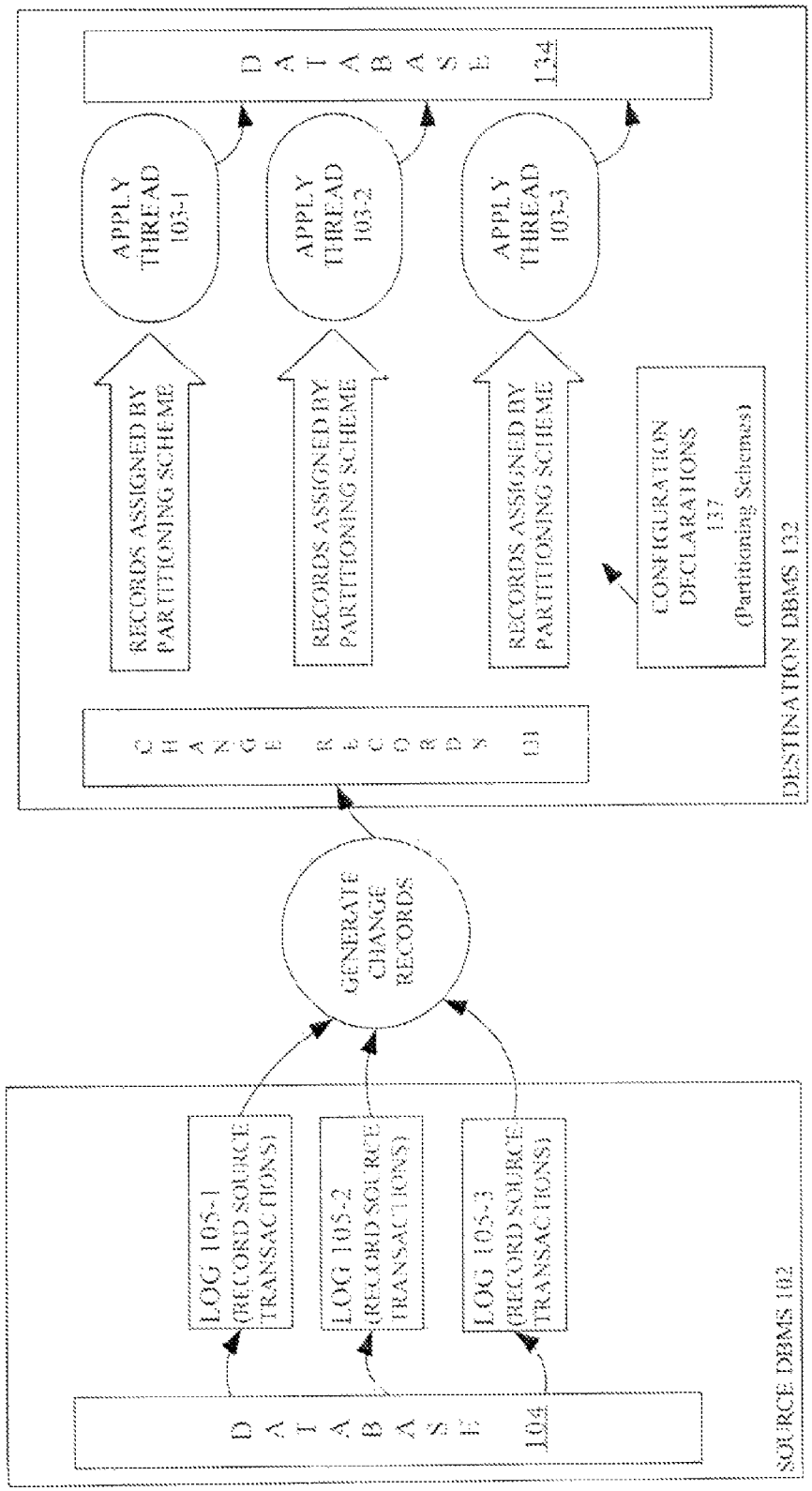
FIG. 1 is a diagram depicting a parallel replication system according to an embodiment of the present invention.

In the following description, for the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Described herein are techniques of parallel logical replication that involve multiple apply threads running on a destination database server applying, in parallel, changes made by source transactions, where the changes of a single source transaction may be applied in parallel by multiple apply threads. For the changes of a given source transaction, multiple apply threads each apply in a separate apply transaction a subset of the changes of the given source transaction. An apply transaction for a source transaction may be committed by an apply thread independently of the commitment of any other apply transaction of the source transaction, that is, without coordinating the committing of another apply transaction executed by another apply thread for the source transaction.

In general, splitting the work of applying changes of source transactions between concurrently executing apply threads improves throughput of applying the changes of the source transactions, particularly when a source transaction is large and the apply threads run on separate computing nodes. The ability of apply threads to apply changes of a source transaction independently enhances the throughput that can be gained through such parallel execution.

A consequence of splitting the changes of a source transaction into multiple independently executed apply transactions is that the destination database transitions between database states that are not consistent with any state that existed on the source database. Some source transaction changes must be applied in the destination database in a state that is consistent with the state that existed for the change when the change was committed or otherwise made at the source database, to avoid database errors. To apply such a change, the destination database is brought to a state that allows the change to be applied correctly or consistently with the source database.

The changes of source transactions are distributed to the apply threads according to one or more partitioning schemes, which may vary between change records of different database objects, such as tables. The partitioning scheme may be based on column values in one or more columns of a table, such as a primary key. For changes to a given row made by a single source transaction or multiple source transactions, the changes to the row are made in the order the respective transactions are committed or the changes were otherwise made.

Also described herein is a configuration language that may be used to configure parallel logical replication. The language facilitates the configuration of various aspects of parallel logical replication, including the number of apply threads, and partitioning schemes for specific database objects.

Database Systems

Embodiments of the present invention are illustrated herein in the context of a database management system ("DBMS"). Therefore, a description of a DBMS is useful. It should be understood, however, that embodiments of the present invention are not limited to relational data, or data stored in a DBMS.

A DBMS manages a database. A DBMS may comprise one or more database servers. A database comprises database data and a database dictionary that are stored on a persistent memory mechanism, such as a set of hard disks or flash memory devices. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server.

A database command may be in the form of a database statement that conforms to a database language. A database language for expressing database commands is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Illustrative Parallel Replication System

FIG. 1 shows parallel replication system 100, which may be used to implement embodiments of parallel logical replication. Referring to FIG. 1, parallel replication system 100 includes source DBMS 102 and destination DBMS 132. Changes to database objects in source database 104 of source DBMS 102 are logically replicated in the destination database 134 of destination DBMS 132. To logically replicate such changes, redo records from redo logs 105-1, 105-2, 105-3 (collectively redo logs 105) of source DBMS 102 are converted and ordered into change records in change records queue 131, which are applied by apply threads 103-1, 103-2, 103-3 (collectively apply threads 103) in apply transactions to destination database 134.

Each apply thread 103, in parallel with other apply threads 103, reads the change records in change records queue 131, determines which of the change records a partitioning scheme assigns to the apply thread, and applies the assigned change records to destination database 134. For the change records of a given source transaction, the subsets of the change records are applied by separate apply threads in separate apply transactions, which may be committed at separate times without coordination, at least until a "synchronization event" is encountered. A synchronization event triggers parallel replication system 100 to perform synchronization handling to synchronize apply threads 103 to a particular source transaction. Synchronization handling is performed, for example, to apply a source transaction that needs to be applied to destination database 134 in a state consistent with a state on source database 104.

According to an embodiment of the present invention, partitioning schemes used by apply threads 103 are defined by configuration declarations 137. Partitioning schemes may partition different tables to separate apply threads, and separate parts of a table to separate apply threads. Configuration declarations may be used to configure various aspects of parallel logical replication, in addition to defining partitioning schemes. The configuration declarations may conform to syntax of a computer language.

In an embodiment, each apply thread 103 runs on a separate node of a multi-node database system. In addition, any embodiment is not limited to multiple apply threads numbering three.

Redo logs 105-1, 105-2, 105-3 store redo records generated by transactions of source DBMS 102, including source transactions to be logically replicated on destination database 134. A redo record records changes made by a transaction to source database 104 or records other types of events, particularly those related to transaction recovery, such as transaction commits and aborts and the creation of checkpoints. A redo record that records a change made by a transaction or that records an event relating to a transaction contains data associating the redo record with the transaction. In addition, a redo record is associated with a logical time, such as a system change number (SCN). The logical time of a redo record identifies the relative time the change and/or event recorded by the redo record occurred relative to other events recorded by other redo records in redo logs 105.

Redo records from redo logs 105 are converted into change records which are stored in change records queue 131, each change record recording the change or event recorded by a corresponding redo record from redo logs 105. The change record records the database changes or events in a format that may be different from that used for redo records in redo logs 105. Each change record is associated with the source transaction and the logical time that are associated with the redo record to which the change record corresponds.

In an embodiment, a change record is not generated for each redo record recording a change to source database 104. For example, only a subset of the database objects in source database 104 are replicated to destination database 134. In this case, redo records not pertinent to changes to the subset of database objects may not be converted into change records.

Change Record Queue

Figure 2:
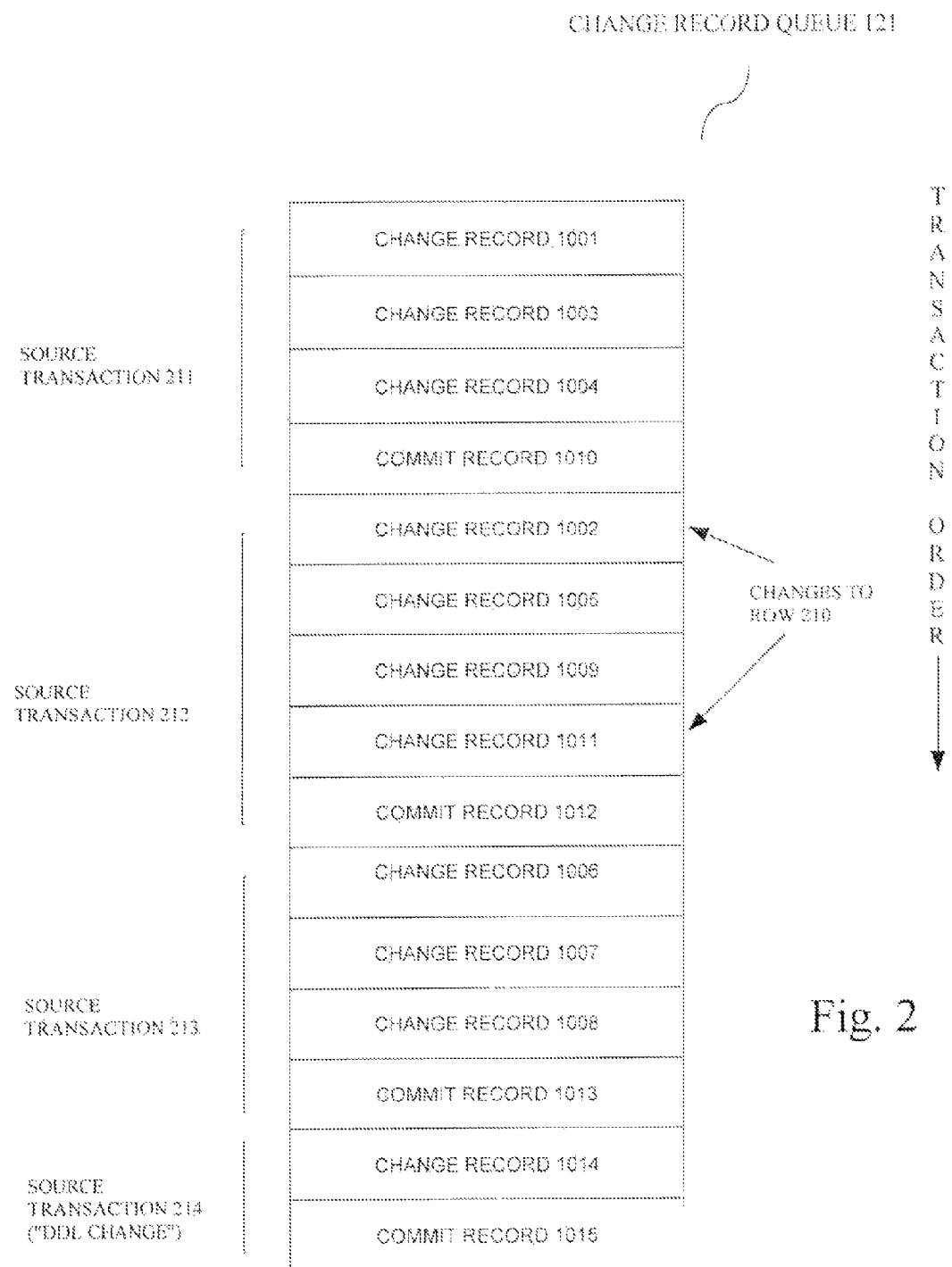
FIG. 2 is a diagram depicting a queue of change records according to an embodiment of the present invention.

FIG. 2 shows change records in change records queue 131 at a particular point in time. In FIG. 2, the change records are labeled with an illustrative logical time. For example, the logical time of change record 1001 is 1001. The change records in change records queue 131 are ordered in transaction order. In transaction order, the change records that correspond to a source transaction are stored in logical time order as a set; each set is ordered according to the logical time recorded by the commit records for the respective source transaction.

The order of change records or transactions may be used to qualify or compare change records to each other. Unless specified otherwise, the order is transaction order. Thus, referring to a change record as being subsequent or previous to another change record means subsequent or previous to the other change record according to transaction order. Referring to a transaction as being subsequent or previous to another transaction means subsequent or previous to the other transaction according to transaction order.

Change records queue 131 includes sets of change records that correspond to source transaction 211, source transaction 212, source transaction 213, and source transaction 214. In transaction order, the set for source transaction 211 includes change records 1001, 1003, 1004, and commit record 1010. Change records 1001, 1003, and 1004 specify changes to rows in source database 104 while commit record 1010 records the commit time of source transaction 211. The commit record for a source transaction follows all change records for a source transaction that change a row or other user data in a database object changed by the source transaction.

The set for source transaction 212 includes change records 1002, 1005, 1009, 1011, and commit record 1012. Change records 1002, 1005, 1009, 1011 specify changes to rows in source database 104 while commit record 1012 records the commit time for source transaction 211. Change record 1002 and 1011 change the same row 210.

The change records of source transaction 213 are similarly ordered. The set includes change records 1006, 1007, and 1008 and commit record 1013.

The contiguous set for source transaction 214 includes a single change record 1014, followed by commit record 1015. Change record 1014 records a DDL change to source database 104.

Various storage structures may be used to implement change records queue 131. Such storage structures include tables, in-memory buffers, and files.

Applying Change Records

The set of change records of a source transaction change is split into separate "apply subsets", each apply subset being applied by a separate apply thread 103 in a separate apply transaction. The change records are split according to one or more partitioning schemes. Within an apply subset that is being applied by an application thread 103, the change records are applied in transaction order. The partitioning scheme may be based on one or more partitioning columns, such as a primary key. A partitioning scheme that is based on one or more partitioning columns is deterministic, such that redo records for the same row are assigned by the partitioning scheme to the same apply set and apply thread, so long as each value in the row's one or more partitioning columns is the same. For example, a partitioning column of a partitioning scheme is SSN (social security number). Redo records are partitioned according to ranges of SSN values. So long as the value for the row's SSN remains the same, change records for the row are applied by the same apply thread 103.

Each apply thread 103 may apply change records for the same source transaction in a separate apply transaction. Thus, change records for a source transaction may be applied in separate apply transactions by separate apply threads. According to an embodiment, an apply thread applies change records in an apply transaction for just on source transaction at a time; the transaction being processed by the apply thread is referred to herein as the current apply transaction.

With respect to change records, the term apply refers to causing the database operation needed to effect the change or event specified by a change record. For example, a change record may specify that a row is added; the change record is applied by causing execution of a database operation to insert the row. A change record may specify a commit; applying the change record entails causing execution of a database operation to commit the apply transactions. Similarly, committing a change record refers to causing a database operation to commit a transaction that applied the change record. Applying a change record may entail issuing database commands that conform to a database language (e.g. SQL) to a database server via a database session.

With respect to an apply transaction, applying the transaction refers to applying change records of the apply transaction, including committing the apply transaction.

Figure 3A:
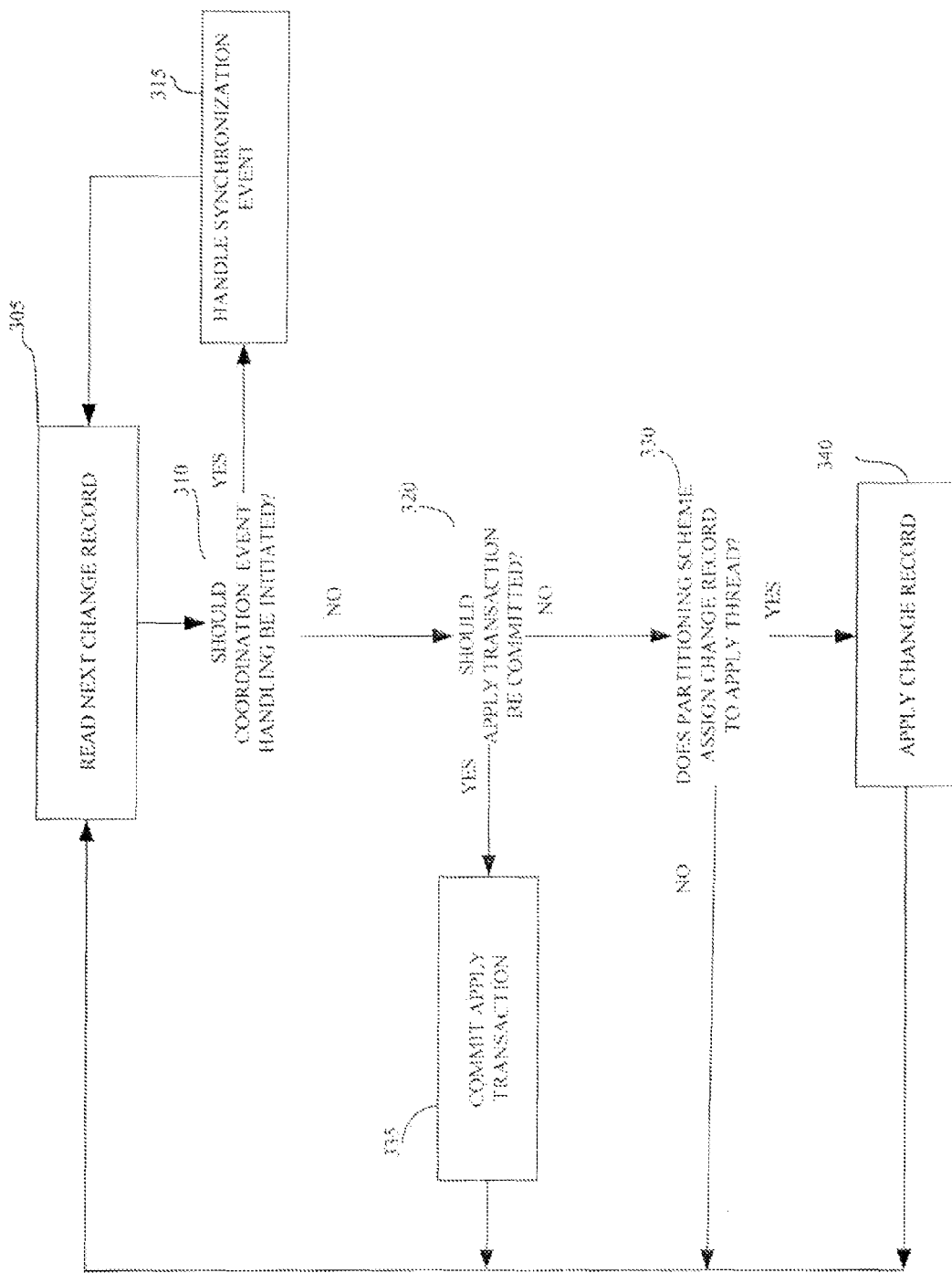
FIG. 3A is a flow chart depicting a procedure followed by multiple apply threads to apply change records in parallel according to an embodiment of the present invention.

FIG. 3A is a flow chart depicting a procedure followed, at least in part, by apply threads to apply change records in parallel according to one or more partitioning schemes.

Referring to FIG. 3A, at 305, a next change record from change records queue 131 is read. The change records from change records queue 131 are read in transaction order, with exceptions, as described in greater detail.

At 310, it is determined whether synchronization event handling should be initiated. If synchronization event handling should be initiated, then at 315, synchronization event handling is undertaken. Procedures for synchronization event handling are described later. The determination may be based on applying synchronization event criteria to a change record to determine that the change record represents a synchronization event. If the synchronization event criteria are satisfied by a change record, then the determination is to initiate synchronization event handling. For example, synchronization event criteria can be that a current change record specifies a DDL change, specifies a change to a foreign key, specifies a change to a partitioning key, or specifies another kind of event representing a synchronization event.

A change record that represents a synchronization event and triggers synchronization event handling is referred to herein as a barrier record and the source transaction of the barrier record is referred to herein as a barrier transaction. The one or more change records that have been applied in an apply transaction by an apply thread before encountering a barrier record are referred to as prefix change records or simply as a prefix.

If the procedure determines that synchronization event handling should not be initiated, then at 320, the procedure determines whether the apply transaction being processed should be committed. For example, the change record may be a commit record recording the commit of the current apply transaction. Because the current apply transaction is a commit record, the procedure determines to commit the current apply transaction. At 325, the current apply transaction is committed and another is started.

If at 320, the procedure determines that the apply transaction being processed should not be committed, then at 330, the procedure determines whether the pertinent partitioning scheme assigns the change record to the apply thread. It should be noted that different tables may have a different partitioning scheme. Partitioning schemes may each be database object specific.

If the partitioning scheme assigns the change record to the apply thread, then at 340, the change record is applied to destination database 134. The procedure returns to step 305 to read another change record from change records queue 131.

Handling Synchronization Events

As shall be explained in greater detail, apply threads 103 do not process change records beyond (in transaction order) the barrier change record until signaled to do so. Because each of apply threads 103 scans change records queue 131, each encounters the same barrier records and pauses until signaled to proceed in some way.

Figure 4:
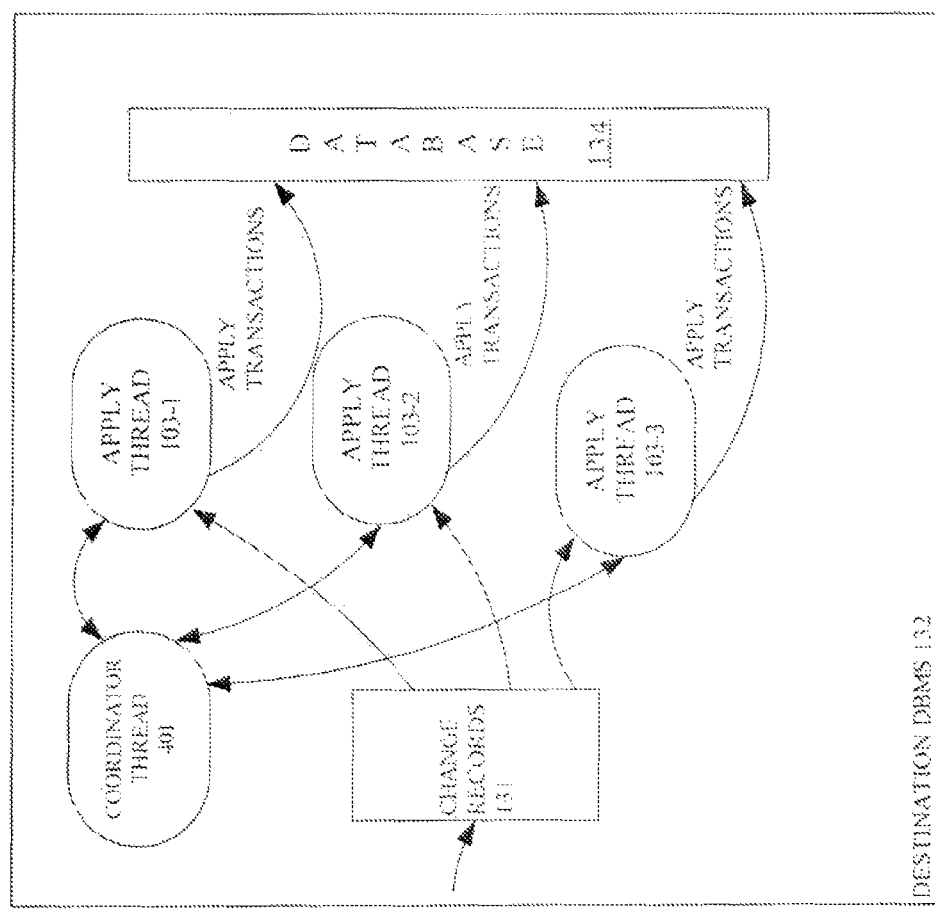
FIG. 4 is a flow chart depicting participants in synchronization event handling according to an embodiment of the present invention.

FIG. 4 depicts participants in synchronization event handling within destination DBMS 132. Referring to FIG. 4, it depicts constituents of destination DBMS 132 previously depicted in FIG. 1. In addition, FIG. 4 depicts coordinator thread 401. Coordinator thread 401 is a thread responsible for managing one or more synchronization events. Synchronization event handling may entail such responsibilities as coordinating operations performed by apply threads 103 during synchronization event handling and applying change records that need to be applied for synchronization event handling. In an embodiment, coordinator thread 401 is a thread dedicated to handling synchronization events and does not apply change records other than for synchronization event handling. In another embodiment, a coordinator thread may be any of apply threads 103 that has been assigned to handle a particular synchronization event.

Figure 5A:
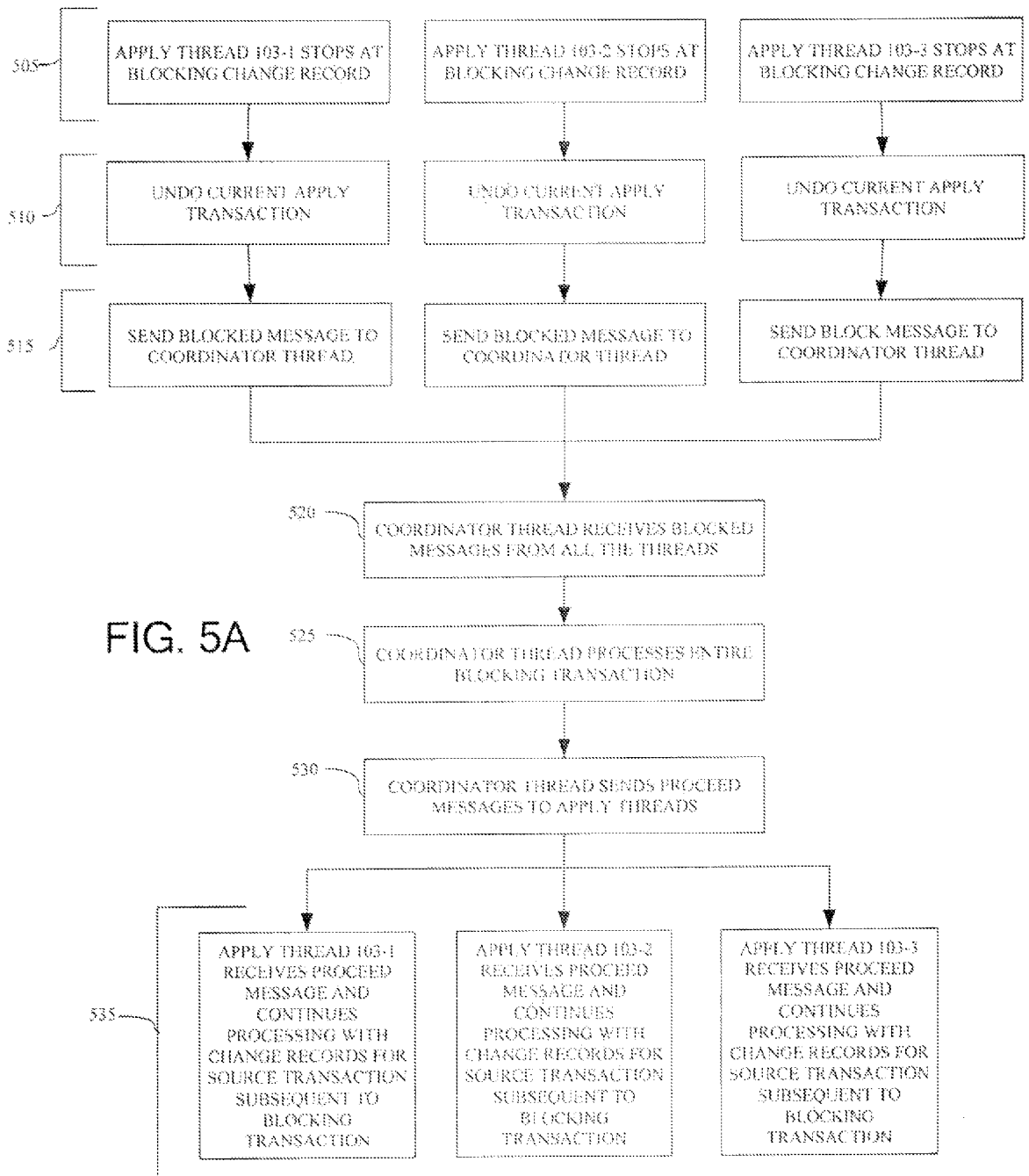
FIG. 5A is a flow chart depicting a procedure for synchronization event handling according to an embodiment of the present invention.

FIG. 5A is a flow chart depicting synchronization event handling according to an embodiment. Referring to FIG. 5A, at 505, apply threads 103-1, 103-2, and 103-3, in response to having encountered a barrier record in change records queue 131 and determining to initiate synchronization event handling (see 210 in FIG. 2), stop reading change records in change records queue 131.

At 510, apply threads 103-1, 103-2, and 103-3 each abort the current apply transaction. Thus, each apply thread 103 rolls back the respective portion of the prefix of the current apply transaction that each had applied, if any.

At 515, after having aborted each respective current apply thread, apply threads 103-1, 103-2, and 103-3 each send blocked messages to coordinator thread 401.

At this stage, destination database server 202 is at a database state that is consistent with the state that existed at source database 104 when the source transaction for the barrier record was committed.

It is important to note that all of apply threads 103 may not be processing change records for the same source transaction when one first reaches a barrier record. Thus, when one of apply threads 103 reaches a barrier record, other of apply threads 103 may be processing change records for earlier source transactions. Eventually, each apply thread will reach and stop at the same barrier record.

For example, apply thread 103-1 is processing change record 1011 for source transaction 212 (see FIG. 2) at operation 305 (see FIG. 3A) while apply threads 103-2 and 103-3 are applying change records for previous source transaction 211. Apply thread 103-1 determines at 310 that synchronization event handling should be initiated in response to determining that change record 1011 changes a primary key value and is thus a barrier change record. Apply thread 103-1 stops applying change records (505), aborts the current apply transaction (510), and sends a blocked message to coordinator thread 401.

Afterwards, apply threads 103-2 and 103-3 commit apply transactions for source transaction 211 and begin processing change records for source transaction 212. At 310, each of apply threads 103-2 and 103-3 determines at 310 that synchronization event handling should be initiated in response to determining that change record 1011 changes a primary key value and is thus a barrier change record; each stops applying change records (505), aborts the respective current apply transaction (510), and sends a blocked message to coordinator thread 401. Destination database 134 is thus in a state consistent with source database 104 when source transaction 212 was committed.

At 520, the coordinator thread 401 receives a blocked message from the apply threads. At 525, coordinator thread 401 applies and commits the entire blocked transaction. At 530, in response to at least committing the entire blocked transaction, the coordinator thread sends proceed messages to apply threads 103, which, at 535, in response to receiving a proceed message, continue on by processing the change records for the source transaction next in transaction order.

Optimization Initiation of Synchronization Event Handling

Synchronization event handling can impede the pace of replication. According to an embodiment, handling of synchronization events is optimized to eliminate initiation of synchronization event handling for events not requiring synchronization event handling to avoid database errors.

For example, a change record for a source transaction changes a partitioning column value. However, the partitioning scheme that is in effect assigns the change record to the same apply thread under both the old and new value. Therefore, any change records to the same row in the same source transaction for both old and new partition key values will be applied in transaction order by the same apply thread. There is no need for synchronization event handling to avoid a database error.

To take advantage of such ways to more efficiently initiate synchronization event handling, more selective synchronization event criteria can be used to detect synchronization events; such synchronization event criteria would not only require a partition key value change but that the change changes the apply thread that the partitioning schema assigns.

In another embodiment, synchronization event handling is performed only between the subset of apply threads needed to avoid database errors. For example, a partitioning scheme maps a source table to apply threads 103-1 and 103-2. Change record 1014 of source transaction 214 see (FIG. 2) records a DDL change to the source table. The DDL change record 1014 is treated as a barrier change record by apply threads 103-1 and 103-2 but not by apply thread 103-3. Synchronization event handling is only performed between apply thread 103-1 and 103-2. In such a case, synchronization event criteria used by apply threads include that a DDL change record is for a source table assigned by a partitioning scheme to apply thread 103-1 and apply thread 103-2.

For example, apply threads 103-1, 103-2, and 103-3 begin processing change record 1014 for source transaction 214. At 310, apply threads 103-1 and 103-2 determine that synchronization event handling should be initiated in response to determining that change record 1014 records a DDL change to the source table while apply thread 103-1 determines otherwise and continues on. Apply thread 103-1 and 103-2 each stop applying change records (505), aborts the respective current apply transaction (510), and sends a blocked message to coordinator thread 401.

At 520, the coordinator thread 401 receives a blocked message from the apply threads 103-1 and 103-2. At 525, coordinator thread 401 applies and commits the entire blocked transaction. At 530, in response to at least committing the entire blocked transaction, the coordinator thread sends proceed messages to apply threads 103-1 and 103-2, which, at 535, in response to receiving a proceed message, continue on by processing the change records for the source transaction next in transaction order.

Apply Grouping

According to an embodiment, changes records read by an apply thread are not applied seriatim as read. Instead, the changes records are grouped and applied as a group, using for example, an array operation. An array operation is typically faster than individual application of a change record and reduces overhead, such as generating redo data. An array operation refers to two or more database operations grouped together for execution by a database server. The two or more operations may involve the same operation type on the same table and/or columns.

The procedure for applying change records in parallel depicted in FIG. 3A may be adapted for apply grouping. Specifically, instead of applying change records as encountered at step 340, the change records are tracked. Change records involving the same type of operation to the same table and/or column are grouped. At operation 335, any tracked change records not applied are applied before committing. This measure may entail performing array operations for grouped change records.

Batch Processing

According to an embodiment, the change records of multiple source transactions are applied and committed together as a batch. Apply threads applying the source transactions as a batch each apply all respective change records of multiple source transactions in a single apply transaction. Thus, an apply transaction executed by an apply thread may apply change records of the multiple source transactions in the batch. Applying source transactions in this way is referred to as batch apply.

Batch apply enables faster and more efficient applying. Batch apply provides a larger set of changes for apply grouping. In general, the benefits of apply grouping are maximized when used for larger sets of change records.

Figure 3B:
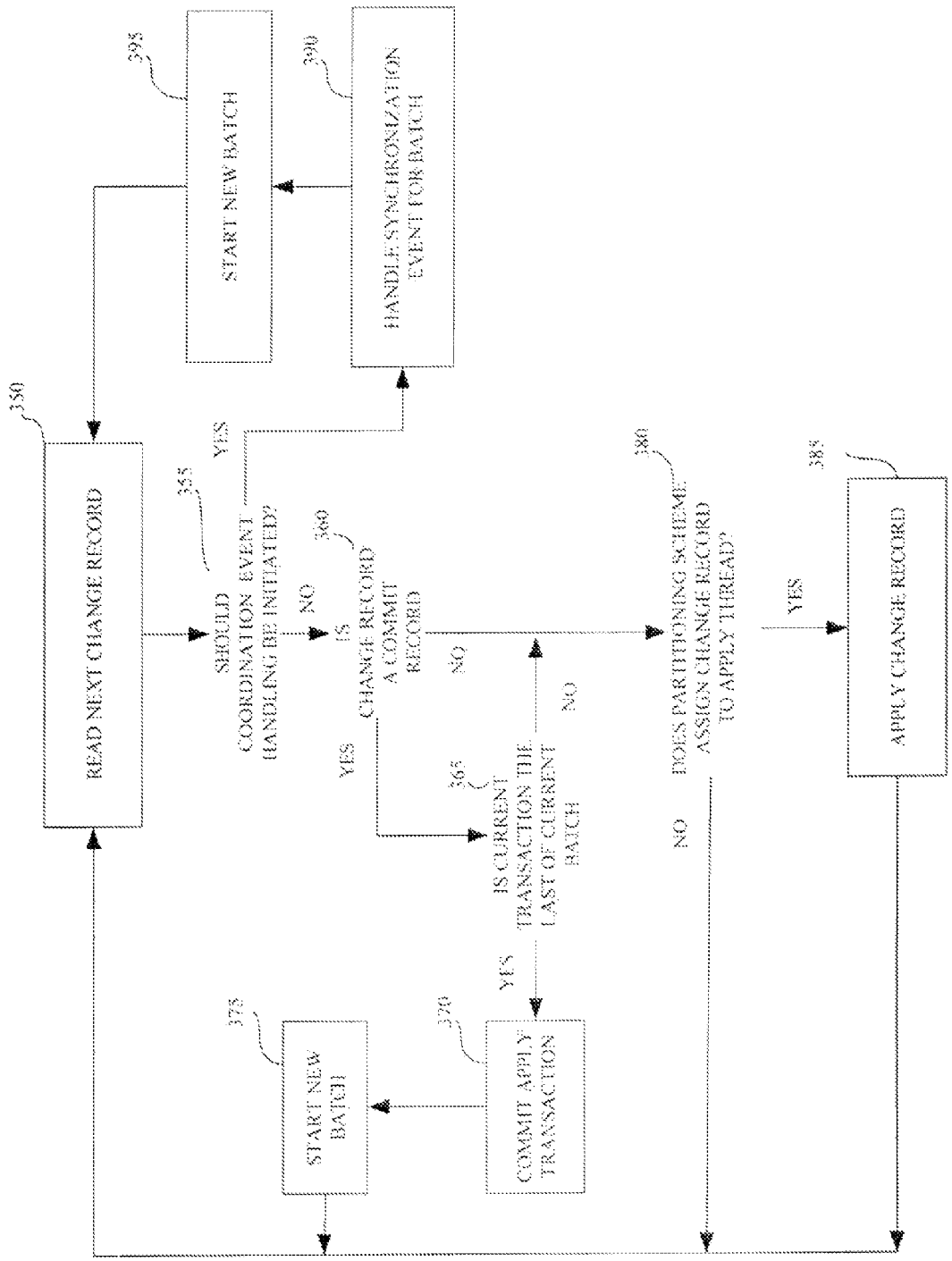
FIG. 3B is a flow chart depicting a procedure followed by multiple apply threads to apply change records in parallel according to an embodiment of the present invention.

FIG. 3B depicts a procedure that employs batch apply. In FIG. 3B, the apply threads begin reading a batch by reading the first change record of a batch. The first change record is generally the first change record of a source transaction, the source transaction being the first in the batch. The apply threads read at least a threshold number of the same change records, the number being referred to as a batch size. When reading change records for a batch, commit records in change records queue 131 are ignored for purposes of triggering commit of the current apply transaction, at least until the batch size number of records is read. Once the batch size number of change records has been read, the apply threads apply the current apply transaction once a commit record is encountered. When an apply transaction is committed, changes applied in the apply transaction that belong to multiple source transactions in the batch are committed together.

During batch apply, a barrier record may be encountered, thus triggering synchronization event handling. Synchronization event handling during batch apply is performed differently, as shall be described in further detail.

FIG. 3B depicts a flow chart of a procedure followed, at least in part, by apply threads to apply change records in parallel using batch apply. Referring to FIG. 3B, at 350, a next change record from change records queue 131 is read. At 355, it is determined whether synchronization event handling should be initiated. If synchronization event handling should be initiated, then at 390, synchronization event handling is undertaken. Procedures for synchronization event handling are described later.

If the procedure determines that synchronization event handling should not be initiated, then at 360, the procedure determines whether the current change record is a commit record. If not, then procedure flows to 380.

If, on the other hand, the current change record is a commit record, then at 365, it is determined whether the current source transaction is the last source transaction for the current batch. According to an embodiment, the determination of whether the current source transaction is the last source transaction for the current batch is made by determining that at least the batch size number of records has been read for the current batch. If so, then at 370, the current apply transaction is committed. At 375, a new batch is initiated.

At 380, the procedure determines whether the pertinent partitioning scheme assigns the change record to the apply thread. If the partitioning scheme assigns the change record to the apply thread, then at 385, the change record is applied to destination database 134. The procedure returns to step 350 to read another change record from change records queue 131.

Synchronization with Batch Processing

Figure 5B:
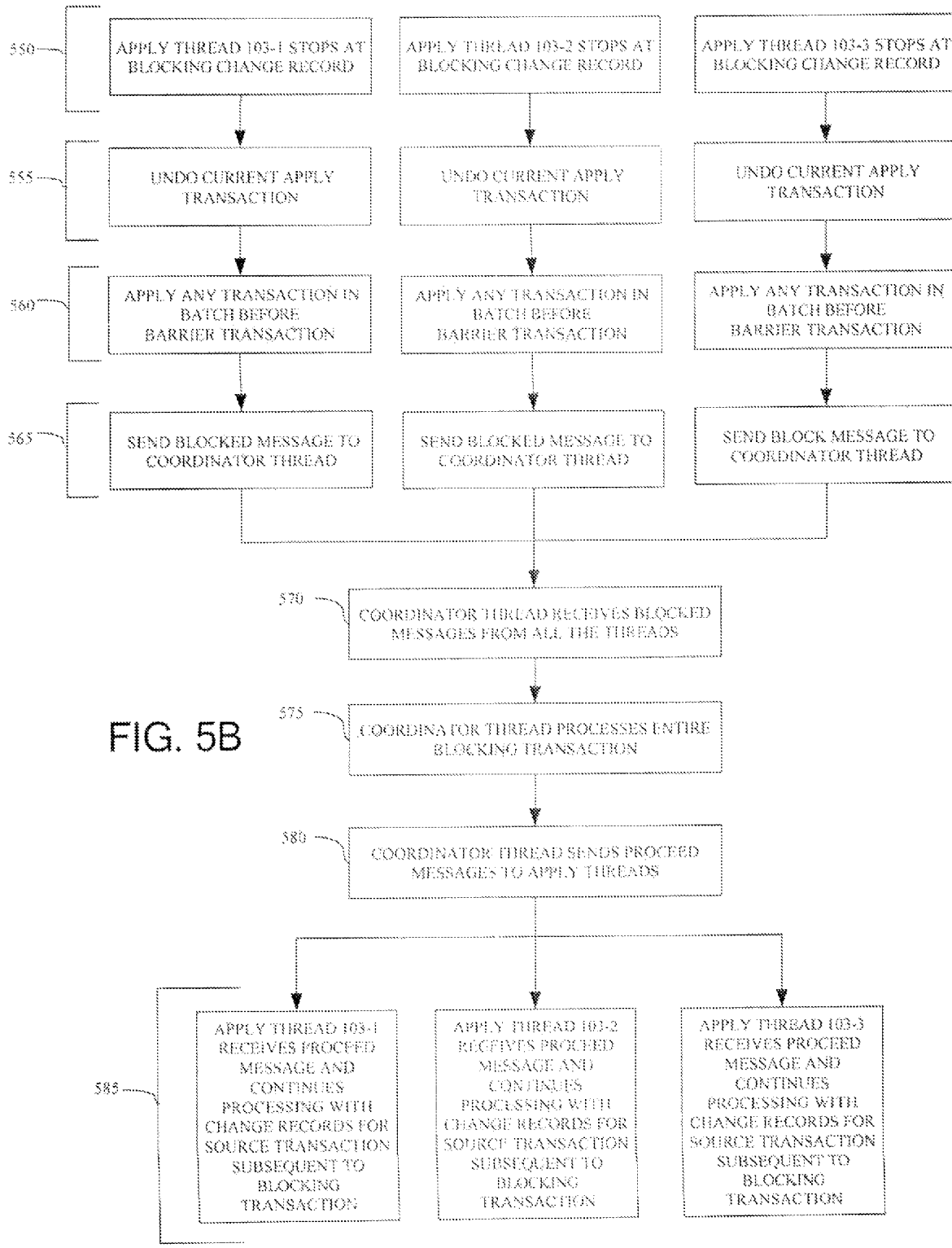
FIG. 5B is a flow chart depicting a procedure for synchronization event handling according to an embodiment of the present invention.

FIG. 5B illustrates a procedure for synchronization event handling for batch apply processing. The procedure is performed when a barrier record of a barrier transaction is encountered while the apply threads are processing a batch of source transactions. When the barrier change record is encountered, the changes applied in the current apply transaction are rolled back, if any, thereby possibly rolling back changes applied for the one or more source transactions in the batch that are previous to the barrier transaction and changes already applied for the barrier transaction. The apply threads then apply changes for the one or more previous transactions, if any, and then stop. The coordinator thread then applies the barrier transaction. In an alternate embodiment, an apply thread is selected to apply the barrier transaction.

Referring to FIG. 5B, FIG. 5B depicts a flow chart depicting synchronization event handling for batch apply according to an embodiment. Referring to FIG. 5B, at 550, apply threads 103-1, 103-2, and 103-3, in response to having encountered a barrier record in change records queue 131 while processing a batch and determining to initiate synchronization event handling (see 210 in FIG. 2), stop reading change records in change records queue 131.

At 555, apply threads 103-1, 103-2, and 103-3 each abort the current apply transaction. Thus, each apply thread 103 rolls back the respective portion of the prefix of the apply transaction that each had applied, if any. The prefix may include change records of one or more source transactions previous to the barrier transaction and one or more change records in the barrier transaction previous to the barrier record.

At 560, apply threads 103-1, 103-2, and 103-3 apply any previous source transactions in the batch previous to the barrier transaction. Applying previous source transactions includes committing the source transactions.

Next, at 565, apply threads 103-1, 103-2, and 103-3 each send blocked messages to coordinator thread 401.

At 570, the coordinator thread 401 receives a blocked message from the apply threads. At 575, coordinator thread 401 applies and commits the entire barrier transaction. At 580, in response to at least committing the entire barrier transaction, coordinator thread 401 sends proceed messages to apply threads 103, which at 585, in response to receiving a proceed message, continue on by processing the change records for the source transaction next in transaction order.

Configuration of Logical Parallel Replication

According to an embodiment of the present invention, configuration declarations are used to configure various aspects of parallel logical replication, including partitioning schemes to use. The configuration declarations may conform to a syntax of a computer language.

Configuration declarations may be stored in any sort of computer storage, including, without limitation, configuration files. Computer administrators may input the configuration declarations into configuration files using text editors or by using configuration applications that store configuration declarations. Parallel replication system 100 reads the configuration declarations to determine how to perform various aspects of parallel logical replication, including determining what partition schemes to use for various database objects.

FIG. 6 illustrate various example declarations that may be included in a configuration file 601 to specify partitioning schemes for tables.

Referring to FIG. 6A, configuration file 601 contains the following declaration:

Map user1.customer, Target user2.customer, THREAD (2)

The above declaration is a "mapping declaration" that specifies a mapping between a replication source and replication target, where the source is a table or portion thereof in a source database and the destination is a table in a destination database to which change records generated for the source are applied. According to an embodiment, a mapping declaration may specify one or more apply threads for applying the change records to the target. In addition, the declarations, alone or in combination, may explicitly or implicitly define a partitioning scheme for distributing change records among the apply threads for a database object. The statement above in FIG. 6A maps source table user1.customer to target table user2.customer, thereby declaring that apply change records for user1.customer should be applied to user2.customer. In addition, the declaration specifies that the apply thread identified as apply thread #2 is to apply the change records. Thus, according to a partitioning scheme declared by this declaration, one apply thread applies all change records to user2.customer for source transactions on user1.customer.

FIG. 6B depicts declarations that explicitly specify a partitioning scheme.

Map user1.customer, Target user2.customer, FILTER (Value-of-primary-key %2==0) THREAD (1)

Map user1.customer, Target user2.customer, FILTER (Value-of-primary-key %2!=0) THREAD (2)

The first declaration in FIG. 6B, in addition to mapping change records for rows having even primary key values that are from source table user1.customer to target table user2.customer, maps the change records to apply thread #1. Similarly, the second declaration in FIG. 6B, in addition to mapping change records for rows having odd primary key values that are from source table user1.customer to target table user2.customer, maps the change records to apply thread #2. Together, these statements specify a partitioning scheme in which change records for rows with even primary key values are applied by apply thread #1 and those with odd primary key values are applied by apply thread #2.

FIG. 6C shows a declaration that specifies the number of apply threads to apply change records and a partitioning key upon which to distribute change records.

Map user1.customer, Target user2.customer, THREAD-RANGE (1-3, PRIMARY_KEY)

The declaration identifies which apply threads are to apply change records and that the change rows are to be split between the apply threads based on the primary key of user1.customer. Any function or procedure may be used to split the change records so long as the function or procedure is based on the primary key and is deterministic. According to an embodiment, a hash function is used to split the change records.

For some sources, it may be desirable to invoke synchronization event handling any time a change record is applied for the source. For example, it may be desirable to invoke synchronization event handling for any change record updating, adding, or deleting a row in a particular table. Such a level of triggering synchronization event handling is referred to herein as full synchronization. According to an embodiment, full synchronization may be declared by including the keyword COORDINATED in a mapping declaration, as shown by FIG. 6D.

Map user1.customer, Target user2.customer COORDINATED

According to an embodiment, change records for targets subject to full synchronization are applied by the coordinator thread 401.

A mapping declaration may also be used to specify that certain events trigger synchronization event handling. For example, the declaration of FIG. 6E.

TABLE user1.customer EVENTACTION(INSERTS)

The above declaration specifies that change records for inserts to table user1.customer trigger synchronization events handling. Such change records would thus become a barrier record.

The declarations may use a wild card syntax to specify sources and targets. For example, FIG. 6F.

Map user1.customer*, Target user2.customer*, THREAD (2)

This declaration assigns to single apply thread #2 change records generated for any source table beginning with 'user1.customer' to any table having the same name within schema user2.

On-Demand Synchronization

According to an embodiment of the present invention, parallel replication system 100 may force synchronization to a source transaction in response to an on-demand synchronization request. The on-demand synchronization request may be triggered by issuing a SYNCHRONIZATION command through a user-interface to, for example, reconfigure the partitioning schemes.

In response to parallel replication system 100 receiving the on-demand synchronization request, coordinator thread 401 transmits a message to apply threads 103 to finish applying the current apply transaction and report the latest source transaction applied. In response, apply threads 103 each finish applying the current apply transaction and report the latest source transaction applied to coordinator thread 401. After receiving the latest source transaction applied from each of apply threads 103, coordinator thread 401 determines a global latest source transaction applied by apply threads 103. Coordinator thread 401 then sends a message to each of the apply threads 103 instructing the apply threads to apply source transactions up to the global latest source transaction and. Apply threads 103 apply source transactions up to the global latest source transaction if needed, ceasing to apply change records for subsequent source transactions, and then send a message to coordinator thread 401 that source transactions have been applied up to the global latest source transaction.

Error Handling

An apply thread may encounter errors while applying changes. One way for handling errors is to stop the apply threads from applying records and alerting an administrator. The administrators use administrative utilities to diagnosis and resolve the errors. Often, the errors can be resolved by causing the apply threads to skip the change record or apply transaction in which the error was encountered, and then proceed processing subsequent change records and source transactions.

Addressing errors by pausing replication to allow administrators to intervene may be undesirably and/or needlessly cause delays. To reduce such delays, some kinds of errors may be handled automatically.

One type of error that may be handled automatically is a row collision error. A row collision error occurs when applying a change record requires a data manipulation operation that is inconsistent with the current row's state. For example, a change record specifies that a row is deleted, which requires performing a row delete operation to apply. However, the row does not yet exist. As another example, a change record specifies to change a column value from an old value to a new value. However, the row's current value does not match the old value specified in the change record.

Automatic handling of row collision errors may be suitable for some replication targets but not others. According to an embodiment of the present invention, configuration declarations may be used to specify which apply threads handle row collision errors automatically and which do not, as demonstrated by the following examples.

NOHANDLECOLLISIONS THREADS(3-7)

The above declaration specifies that apply threads #3-#7 do not handle row collision errors automatically.

HANDLECOLLISIONS THREAD(5)

The above declaration specifies that apply threads #5 handles row collision errors automatically.

Various Other Alternate Embodiments

The descriptions herein of various embodiments are illustrative and not limiting, and include details that may vary between various embodiments or may not be included in various embodiments.

For example, synchronization event handling may be performed using intra-transaction commits to commit the prefix of a source transaction. Specifically, when each apply thread encounters a barrier record, the apply thread commits the portion of the prefix the apply thread has applied, if any and stops. Once the apply threads have stopped, an apply thread or coordinator applies and commits the barrier record. After completing the commit, the apply threads continue to apply change records subsequent to the barrier record.

There are various models that vary based on whether non-native database server components manage and control key replication functions. Under the replication-client model, a replication-client module that is not a native software component of the database server of the source or destination DBMS manages and controls replication. The replication client is distributed, with a "source-side" component on the source DBMS and "target-side" component on the destination DBMS. The source-side component generates change records and ships them to the destination DBMS. The destination-side component applies them by issuing database commands to the destination DBMS.

In an embodiment, the destination-side component may instantiate a session on the destination DBMS for each apply thread. In addition, the destination-side component may issue the database commands (e.g. inserts, updates, deletes) through database server APIs to the database sessions of the apply threads as needed to carry out the partitioning schemes specified by mapping declarations.

In the "direct-model", the native components of the database server are primarily responsible for managing and controlling most if not all functions of replication. In an embodiment, the source DBMS sends change records directly to the destination DBMS. The change records may be copies of redo log records.

Replication Statistics

In an embodiment, parallel replication system 100 tracks and reports replication statistics useful for administrating replication. Replication statistics include aggregated statistics that can be used as a diagnostic aid to manage the degree of parallelism. Replication statistics include, for example: (1) number of synchronization events and types of synchronization events (e.g. DDL changes, number of partitioning key updates), (2) number of synchronization events that result in a roll back, (3) the minimum and maximum logical time lag between different apply threads. The statistics may be reviewed to ensure that the partitioning scheme specified is providing the desired level of parallelism. For example, a large number of rollbacks due to primary key updates might indicate that range based partitioning is less than optimal for a particular table.

Similarly, by observing the logical time lag between apply threads, the efficiency of the partitioning schemes can be determined. If extremely skewed to a few apply threads, the partitioning schemes may be adjusted to repartition the workload.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
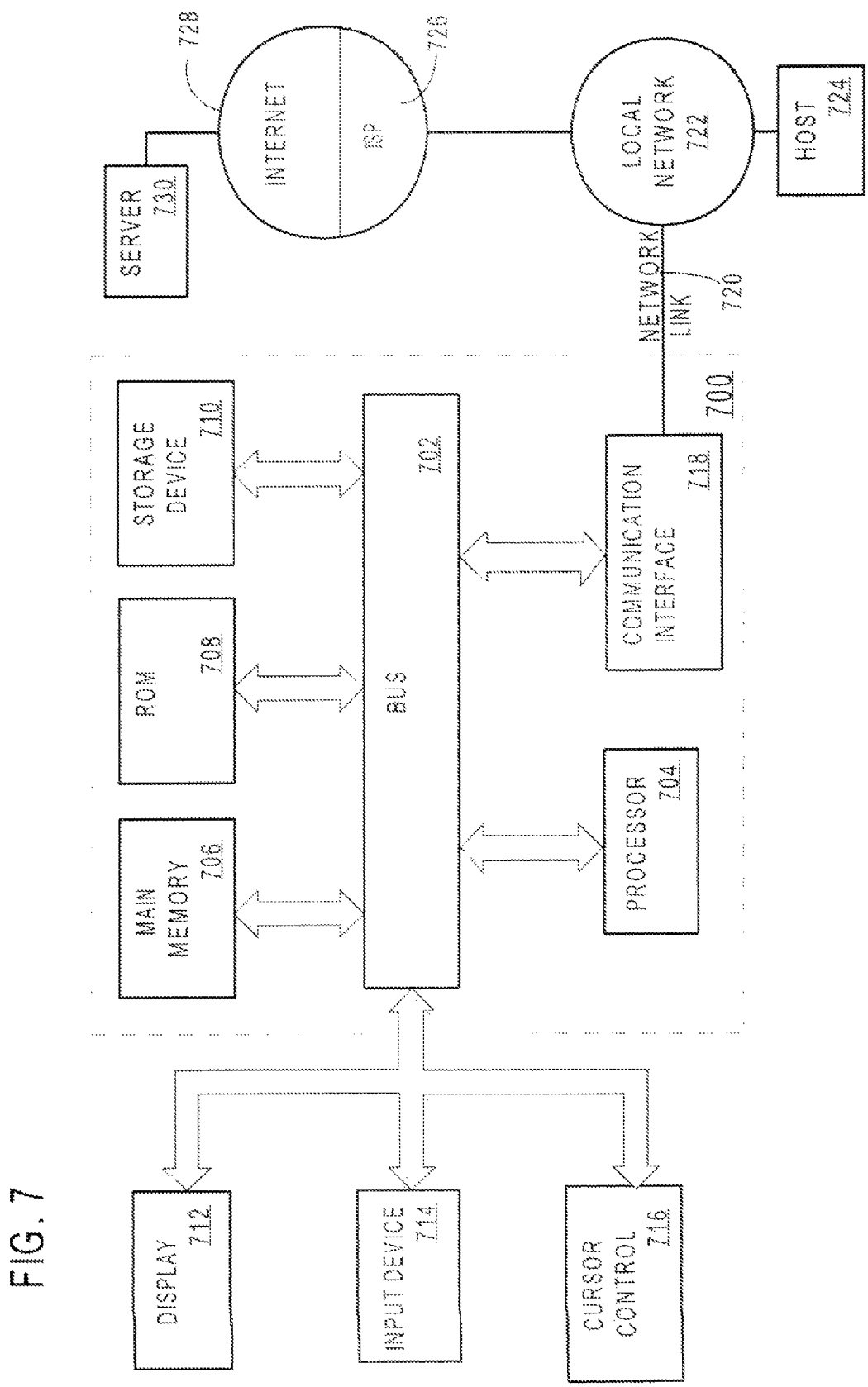
FIG. 7 depicts a computer system upon which an embodiment of the present invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. A method, comprising:
according to a partitioning scheme, distributing, to each apply thread of a plurality of apply threads, a respective subset of change records of a plurality of change records describing changes made by a first source transaction;
each apply thread of said plurality of apply threads applying the respective subset of change records of said first source transaction in a respective apply transaction that is different from any apply transaction executed by any other apply thread of said plurality of apply threads for said first source transaction; and
each apply thread of said plurality of apply threads committing the respective apply transaction without coordinating the committing of the respective apply transaction with committing of any other apply transaction of said first source transaction;
wherein the method is performed by one or more computing devices.

2. The method of claim 1, further including:
each apply thread of said plurality of apply threads encountering a second source transaction that made changes described by a second plurality of change records;
in response to each apply thread of said plurality of apply threads encountering the second source transaction:
causing a single thread to apply said second plurality of change records;
in response to committing said second plurality of change records, said plurality of apply threads applying a third plurality of change records for subsequent source transactions that are later in transaction order than said second source transaction.

3. The method of claim 1, further including:
each apply thread of said plurality of apply threads encountering a second source transaction that made changes described by a second plurality of change records;
in response to each apply thread of said plurality of apply threads encountering the second source transaction:
causing each apply thread of said plurality of apply threads to roll back a respective apply transaction for said second source transaction;
causing a single thread to apply said second plurality of change records;
apply threads after committing said second plurality of change records, said plurality of apply threads applying a third plurality of change records for subsequent source transactions that are later in transaction order than said second source transaction.

4. The method of claim 1, further including:
each apply thread of said plurality of apply threads encountering a particular change record of a second plurality of change records describing changes made by a second source transaction;
in response to each apply thread of said plurality of apply threads encountering a particular change record of the second plurality of change records:
causing each apply thread of said plurality of apply threads to commit a change record of the second plurality of change records;
causing a single thread to commit said particular change record;
after committing said particular change record, said plurality of apply threads applying one or more subsequent change records for one or more source transactions that follow said particular change record in transaction order.

5. The method of claim 1, further including:
each apply thread of said plurality of apply threads encountering a second source transaction that made changes described by a second plurality of change records;
in response to each apply thread of said plurality of apply threads encountering the second source transaction:
causing each apply thread of said plurality of apply threads to roll back changes applied by the respective apply transaction for said second source transaction;
causing each apply thread of said plurality of apply threads to commit the respective apply transaction after causing said each apply thread of said plurality of apply threads to roll back changes applied by the respective apply transaction for said second source transaction;
causing a single thread to apply said second plurality of change records; and
after committing said second plurality of change records, said plurality of apply threads applying a third plurality of change records for subsequent source transactions that are later in transaction order than said second source transaction.

6. The method of claim 1, further including:
in response to receiving a request to synchronize said plurality of apply threads:
selecting a second source transaction; and
causing said plurality of apply threads to cease applying source transactions after said second source transaction in transaction order.

7. The method of claim 1,
wherein each apply thread of said plurality of apply threads runs on a separate node of a multi-node database system.

8. The method of claim 1, wherein the partitioning scheme is based on configuration declarations.

9. The method of claim 8, wherein said configuration declarations include a first declaration that specifies that rows that satisfy one or more criteria are to be applied by a particular apply thread of said plurality of apply threads.

10. The method of claim 8, wherein said configuration declarations include a first declaration that specifies a number of apply threads to use to apply change records to a particular source table.

11. The method of claim 10, wherein said first declaration specifies a partitioning scheme for distributing said change records for said particular source table to said number of apply threads.

12. The method of claim 8, wherein the partitioning scheme is based on configuration declarations, wherein a declaration of the configuration declarations specifies full synchronization.

13. The method of claim 8, wherein said configuration declarations include a declaration that declares that a certain apply thread automatically handle row collision errors, wherein the method further includes said certain apply thread automatically handling row collision errors responsive to said declaration.

14. One or more non-transitory computer-readable media storing instructions which, when executed by one or more processors, cause:
according to a partitioning scheme, distributing, to each apply thread of said plurality of apply threads, a respective subset of change records of a plurality of change records describing changes made by a first source transaction;
each apply thread of said plurality of apply threads applying the respective subset of change records of said first source transaction in a respective apply transaction that is different from any apply transaction executed by any other apply thread of said plurality of apply threads for said first source transaction; and
each apply thread of said plurality of apply threads committing the respective apply transaction without coordinating the committing of the respective apply transaction with committing of any other apply transaction of said first source transaction.

15. The one or more non-transitory computer-readable media of claim 14, wherein the instructions, that when executed by said one or more processors, further cause:
each apply thread of said plurality of apply threads encountering a second source transaction that made changes described by a second plurality of change records;
in response to each apply thread of said plurality of apply threads encountering said second source transaction:

causing a single thread to apply said second plurality of change records;
in response to committing said second plurality of change records, said plurality of apply threads applying a third plurality of change records for subsequent source transactions that are later in transaction order than said second source transaction.

16. The one or more non-transitory computer-readable media of claim 14, wherein the instructions, that when executed by said one or more processors, further cause:
each apply thread of said plurality of apply threads encountering a second source transaction that made changes described by a second plurality of change records;
in response to each apply thread of said plurality of apply threads encountering the second source transaction:
causing each apply thread of said plurality of apply threads to roll back a respective apply transaction for said second source transaction;
causing a single thread to apply said second plurality of change records;
apply threads after committing said second plurality of change records, said plurality of apply threads applying change records for subsequent source transactions that are later in transaction order than said second source transaction.

17. The one or more non-transitory computer-readable media of claim 14, wherein the instructions, that when executed by said one or more processors, further cause:
each apply thread of said plurality of apply threads encountering a particular change record of a second plurality of change records describing changes made by a second source transaction;
in response to each apply thread of said plurality of apply threads encountering a particular change record of the second plurality of change records:
causing each apply thread of said plurality of apply threads to commit a change record of the second plurality of change records;
causing a single thread to commit said particular change record;
after committing said particular change record, said plurality of apply threads applying one or more subsequent change records for one or more source transactions that follow said particular change record in transaction order.

18. The one or more non-transitory computer-readable media of claim 14, wherein the instructions, that when executed by said one or more processors, further cause:
each apply thread of said plurality of apply threads encountering a second source transaction that made changes described by a second plurality of change records;
in response to each apply thread of said plurality of apply threads encountering the second source transaction:
causing each apply thread of said plurality of apply threads to roll back changes applied by the respective apply transaction for said second source transaction;
causing each apply thread of said plurality of apply threads to commit the respective apply transaction after causing said each apply thread of said plurality of apply threads to roll back changes applied by the respective apply transaction for said second source transaction;
causing a single thread to apply said second plurality of change records; and
after committing said second plurality of change records, said plurality of apply threads applying a third plurality of change records for subsequent source transactions that are later in transaction order than said second source transaction.

19. The one or more non-transitory computer-readable media of claim 14, wherein the instructions, that when executed by said one or more processors, further cause:
in response to receiving a request to synchronize said plurality of apply threads:
selecting a second source transaction; and
causing said plurality of apply threads to cease applying source transactions after said second source transaction in transaction order.

20. The one or more non-transitory computer-readable media of claim 14,
wherein each apply thread of said plurality of apply threads runs on a separate node of a multi-node database system.

21. The one or more non-transitory computer-readable media of claim 14, wherein the partitioning scheme is based on configuration declarations.

22. The one or more non-transitory computer-readable media of claim 21, wherein said configuration declarations include a first declaration that specifies that rows that satisfy one or more criteria are to be applied by a particular apply thread of said plurality of apply threads.

23. The one or more non-transitory computer-readable media of claim 21, wherein said configuration declarations include a first declaration that specifies a number of apply threads to use to apply change records to a particular source table.

24. The one or more non-transitory computer-readable media of claim 23, wherein said first declaration specifies a partitioning scheme for distributing said change records for said particular source table to said number of apply threads.

25. The one or more non-transitory computer-readable media of claim 21, wherein the partitioning scheme is based on configuration declarations, wherein a declaration of the configuration declarations specifies full synchronization.

26. The one or more non-transitory computer-readable media of claim 21, wherein said configuration declarations include a declaration that declares that a certain apply thread automatically handle row collision errors, wherein the instructions further cause said certain apply thread automatically handling row collision errors responsive to said declaration.

\* \* \* \* \*